Aug. 14, 1945.     O. H. CROWELL     2,382,296
RAZOR BLADE WITH INTEGRAL GUARD
Filed Aug. 24, 1944

INVENTOR.
Oscar H. Crowell
BY Victor J. Evans & Co.
ATTORNEYS

Patented Aug. 14, 1945

2,382,296

UNITED STATES PATENT OFFICE 2,382,296

RAZOR BLADE WITH INTEGRAL GUARD

Oscar H. Crowell, Russellville, Ala.

Application August 24, 1944, Serial No. 550,978

2 Claims. (Cl. 30—47)

My present invention, in its broad aspect, has to do with improvements in safety razors, wherein the blade body is cylindrical in cross-section and split longitudinally to provide a slot, one edge wall of which is sharpened and constitutes the cutting edge, and the other and opposed edge of which is beveled and constitutes the guard edge, the blade being notched to be engaged by a simple bent metal handle for operation.

Some of the advantages of my improved blade and handle are: (1) it is formed of but two parts and can be manufactured and sold at a relatively small price; (2) it is readily cleaned and will not clog; (3) there are no separate blades to be replaced and no parts which require putting together and taking apart for cleaning, and (4) the handle part is simple in construction and may be easily detached from the blade for packing and the like.

Other and equally important objects and advantages will be apparent from the following description taken in connection with the accompanying drawing, but changes may be made in size, shape, form, construction and arrangement of parts provided same fall within my broad inventive concept and what is claimed.

In the drawing wherein I have illustrated a preferred form of my invention:

In the drawing wherein like characters of reference are used to designate like or similar parts throughout the several views.

Figure 1:
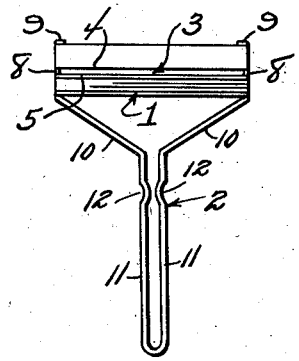
Figure 1 is a front elevation looking toward the cutting edge.
Figure 3:
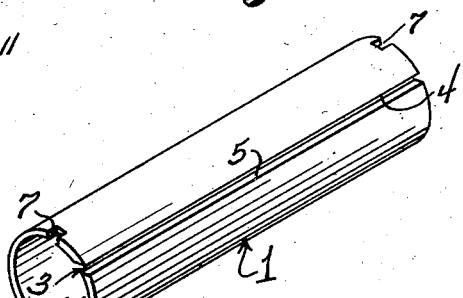
Figure 3 is a perspective view of the blade per se.
Figure 2:
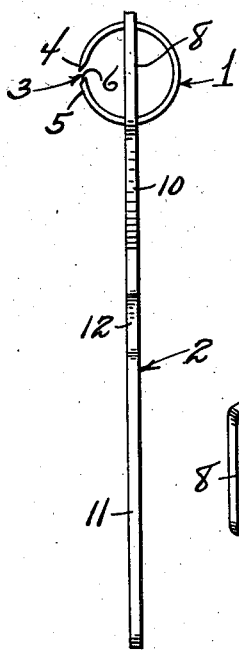
Figure 2 is a side elevation.
Figure 4:
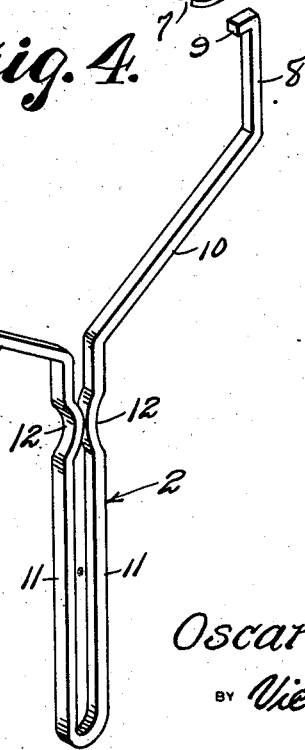
Figure 4 is a perspective view of the handle per se.

The numeral 1 designates the blade and 2 the handle.

The blade 1 is cylindrical in cross section and is split to form a longitudinal slot 3 one edge 4 of which is sharpened to provide a cutting edge, and the other edge 5 of which is beveled as at 6 in the same general direction as the bevel of the cutting edge to provide a guard.

At each end of the blade are two diametrically opposed notches 7 in which are received the parallel clamping arms 8 of the one-piece handle 2. The end of each arm is turned over at right angles to provide a finger 9 and the portions 10 of the handle leading from the opposite end of each arm are obliquely bent toward each other and then bent in parallelism as at 11 to form a grip. Opposed parts of the handle forming the grip are formed with curved offsets 12 adjacent portions 10.

The handle is applied to the blade by simply placing the arms 8 in the notches 7 of the blade 1 in which case the opposed fingers 9 over-lie the blade and prevent displacement. The material of the handle has inherent resiliency to improve the connection between the handle and blade.

The blade is simply drawn through the beard by the handle at the proper angle to give an effective shave and there is no clogging, and the safety razor may be readily cleaned and kept in proper condition.

While I have described a specific form of my invention in the foregoing for purposes of illustration, it is to be understood that interpretation of my invention is to be made only in the light of the subjoined claims.

I claim:

1. A safety razor, comprising a tubular blade portion split to provide adjacent parallel edges, one of which is sharpened to provide a cutting edge, said body being notched, and a one piece handle having arms engaging in the notches.

2. A safety razor, comprising an elongated body, cylindrical in cross-section and split lengthwise to provide a slot, one edge wall of the slot sharpened to provide a cutting edge, the other edge beveled to form a guard, the body having diametrically opposed end notches, and a one piece handle bent to form spaced, parallel arms engaging in the end notches to attach the blade thereto.

OSCAR H. CROWELL.